(12) United States Patent
Bruckmann et al.

(10) Patent No.: US 6,683,801 B2
(45) Date of Patent: Jan. 27, 2004

(54) LOW-INDUCTANCE BUSBAR SYSTEM FOR A MATRIX CONVERTER

(75) Inventors: Manfred Bruckmann, Nürnberg (DE); Olaf Simon, Bruchsal (DE)

(73) Assignee: Siemens Aktiengesellschaft, München (DE)

(*) Notice: Subject to any disclaimer, the term of this patent is extended or adjusted under 35 U.S.C. 154(b) by 0 days.

(21) Appl. No.: 10/357,305

(22) Filed: Feb. 3, 2003

(65) Prior Publication Data

US 2003/0174527 A1 Sep. 18, 2003

Related U.S. Application Data

(63) Continuation of application No. PCT/DE01/02793, filed on Jul. 23, 2001.

(30) Foreign Application Priority Data

Aug. 3, 2000 (DE) .......................................... 100 37 970

(51) Int. Cl.[7] .............................................. H02M 1/00
(52) U.S. Cl. ...................................................... 363/144
(58) Field of Search .............................. 363/140, 144; 257/700, 701, 723, 724, 725; 361/624, 637, 648

(56) References Cited

U.S. PATENT DOCUMENTS

| 4,809,153 A | | 2/1989 | Bremer et al. |
| 6,028,779 A | | 2/2000 | Sakamoto et al. |
| 6,456,516 B1 | * | 9/2002 | Bruckmann et al. ........ 363/144 |
| 6,528,903 B2 | * | 3/2003 | Steinke ......................... 307/39 |
| 6,603,647 B2 | * | 8/2003 | Briesen et al. ............. 361/91.1 |

FOREIGN PATENT DOCUMENTS

| DE | 197 17 550 A | 10/1998 |
| EP | 0 987 761 A | 3/2000 |

* cited by examiner

Primary Examiner—Matthew V. Nguyen
(74) Attorney, Agent, or Firm—Henry M. Feiereisen

(57) ABSTRACT

A low-inductivity busbar system for a matrix converter which includes a plurality of switch elements, in particular semiconductor switches, disposed in a 3×3 matrix. The matrix converter is connected on the network side by the busbar system to a plurality of capacitor elements for supply of three input voltage potentials to the matrix converter. The busbar system includes of a plurality of busbar sections disposed in two levels and isolated from one another.

19 Claims, 2 Drawing Sheets

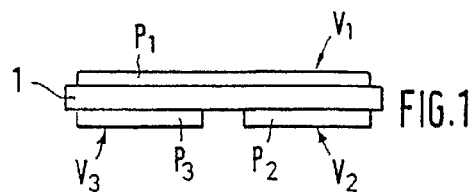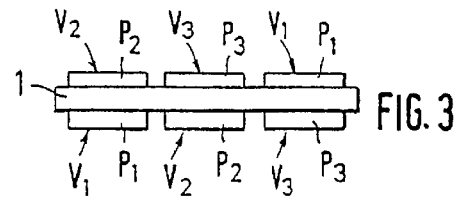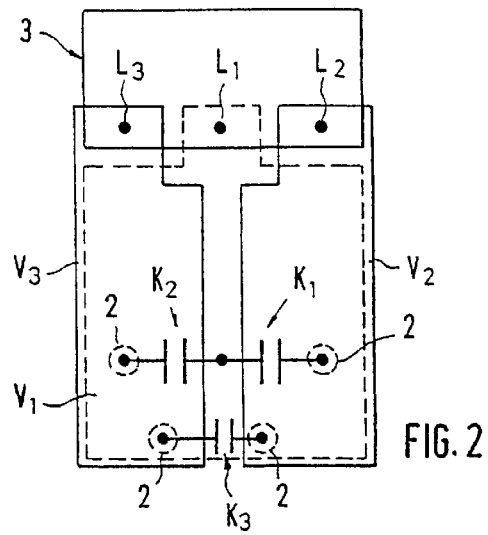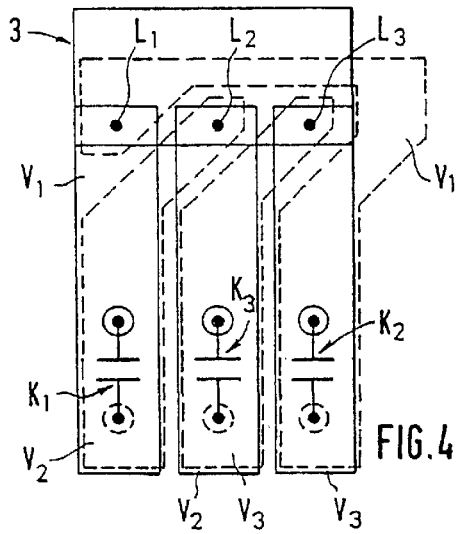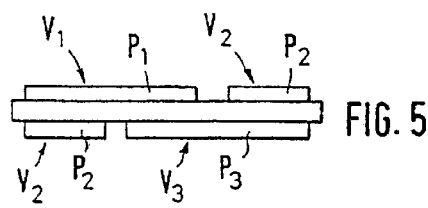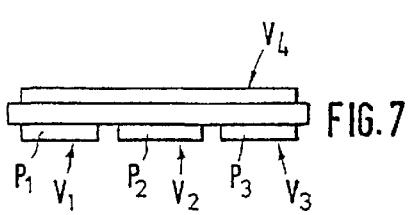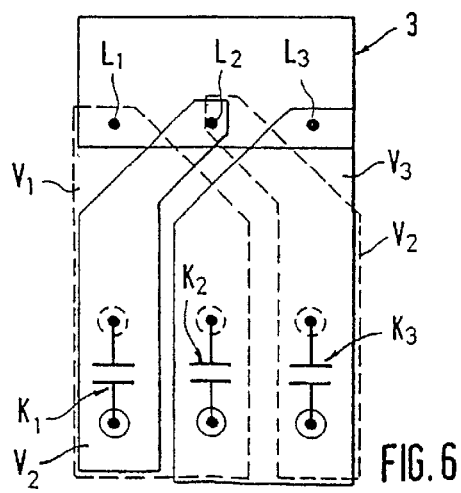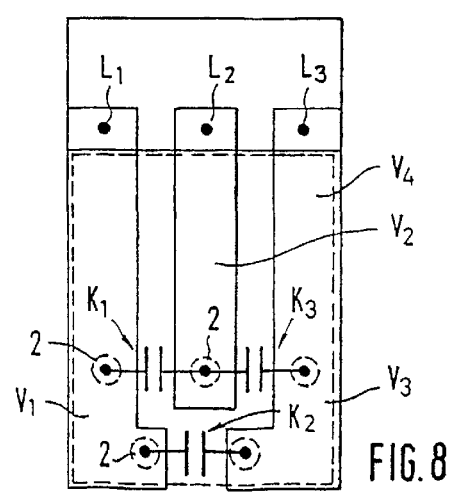

LOW-INDUCTANCE BUSBAR SYSTEM FOR A MATRIX CONVERTER

CROSS-REFERENCES TO RELATED APPLICATIONS

This application is a continuation of prior filed copending PCT International application no. PCT/DE01/02793, filed Jul. 23, 2001, which was not published in English and which designated the United States and on which priority is claimed under 35 U.S.C. §120, the disclosure of which is hereby incorporated by reference.

This application claims the priority of German Patent Application, Serial No. 100 37 970.2, filed Aug. 3, 2000, pursuant to 35 U.S.C. 119(a)–(d), the disclosure of which is incorporated herein by reference.

BACKGROUND OF THE INVENTION

The present invention relates to a busbar system for a matrix converter having a number of switching elements, in particular semiconductor switches, which are arranged in a 3×3 matrix.

As is known, a matrix converter includes a self-commutated direct converter which allows a rigid three-phase network to be converted to a system with a variable voltage and frequency. Known matrix converters have a number of electrical switching elements, in particular semiconductor switches (for example Insulated Gate Bipolar Transistors (IGBT)), which are arranged in a switch matrix. The power-electronic switches are arranged in a 3×3 matrix, so that each of the three output phases can be electrically connected to one input phase. On the network side, the matrix converter or the input-side connections is or are connected to capacitor elements, which ensure stable voltage conditions for the switching elements. Since there are three input phases and input voltages, three corresponding capacitor elements are also provided. The connection is made by means of the low-voltage busbar system. Only the presence of the capacitor elements and of the low-inductance busbar system makes it possible for the semiconductor switches in the matrix converter to commutate without excessive overvoltages, so that it is possible to operate an ohmic inductive load, for example a motor. In the matrix converter, three potentials of the input voltage must be connected with low inductance from the input capacitor elements to the semiconductor module which forms the 3×3 switch matrix (or to the modules in a configuration in which the matrix is in the form of three phases which each have modules with three switches).

Conventional busbar systems typically include a plurality of busbar sections, which are arranged in three levels and are isolated from one another, for which purpose appropriate insulation layers are provided between the individual busbar system levels. Overall, this results in a three-layer busbar system. The low inductance is achieved by locating the busbar system levels as close to one another as possible, with the busbar sections having a correspondingly large area.

The conventional busbar system formed with three layers, however, tends to have a high inductance, with the distance between the two outer busbar sections determining the maximum stray inductance. Furthermore, the inner conductor is difficult to cool, since it is largely embedded between the two other busbar sections. In addition, the manufacturing process is complex.

It would therefore be desirable and advantageous to provide an improved busbar system which obviates prior art shortcomings and has a lower stray inductance and a simple design.

SUMMARY OF THE INVENTION

The invention relates to a low-inductance busbar system for a matrix converter having a number of switching elements, in particular semiconductor switches, which are arranged in a 3×3 matrix, with the matrix converter being connected on the network side to a number of capacitor elements, via which three input voltage potentials can be passed to the matrix converter. The busbar system has only two layers which are arranged isolated from one another in two levels. The two levels with the various busbar sections can be closely spaced (only the insulating layer is located between them), so that the stray inductance can be reduced even further. The busbar sections forming the respective rail pairs and performing the commutation in accordance with the respective switching state of the switch matrix are appropriately shaped and designed, and are suitably distributed within the levels.

Furthermore, there are no cooling problems since only two conductor levels are provided, which can be easily cooled from the outside. Such busbar system can also be manufactured more easily, since the busbar sections can be applied as flat, metallic conductor layers in a simple manner to an insulating layer of an appropriate size and design. For example, the conductor layers can be in the form of coatings on a board, for example, a printed circuit board (PCB). Safe and reliable processes for coating conductors on PCB are known in the art and can be used to produce the low-inductance busbar system according to the invention.

According to one aspect of the invention, at least one busbar section is provided for each input potential. The busbar sections can be arranged in different ways, depending on the position of the busbar sections in the two levels, while keeping the inductance of the busbar system as low as possible. As discussed below, this can be achieved using a single busbar section for each input potential, or a plurality of busbar sections for one or the other input potential.

According to another feature of the invention, a first large-area busbar section can be provided for the first input potential in the first level, and second and third busbar sections, which at least partially overlap with the first busbar section, can be provided for the second and third input potentials in the second level. Two busbar section pairs, between which the voltage is commutated, are hereby routed alongside one another, with the potentials which are involved in one pair being located one above the other in the two layers. The low-inductance commutation in the third voltage pair, which is located in the second level, is achieved by forming eddy currents in the line routing of the large-area first busbar section in the first level, with the two busbar sections between which the voltage is commutated being arranged alongside each other. Accordingly, a third busbar section is included for this commutation.

For reducing the stray inductance as much as possible, the first busbar section can cover at least 75% of the area of the two other busbar sections. The overlapping area should be as large as possible.

According to another feature of the invention, an associated busbar section can be provided for each input potential in the first level and in the second level. All three possible busbar section pairs between which the voltage is commutated are thereby routed alongside one another, with one busbar section being arranged in the first level, and the other corresponding busbar sections being arranged underneath in the second level. The busbar sections can be arranged such that the respective busbar sections in the first level and in the second level, which form a commutation voltage pair, are located directly opposite one another and overlap with one another over as large an area as possible.

According to another feature of the invention, a busbar section which is associated with the first input potential and a busbar section which is associated with the second input potential can be provided in the first level, and a busbar section which is associated with the second input potential and a busbar section which is associated with the third input potential can be provided in the second level, with the busbar sections being arranged and designed such that the busbar sections which form one commutation voltage pair are opposite one another, or at least partially cover one another. Accordingly, two busbar sections which are each associated with a different input potential can be provided in each level, with one of these busbar sections having a considerably larger area than another corresponding busbar sections. The relatively large area busbar sections which are located in different levels and are each associated with different potentials and furthermore likewise form a commutation voltage pair can then also overlap with one another. The area over with which the busbar sections in each case overlap should essentially be of the same size.

According to yet another feature of the invention, an busbar section can be provided for each input potential in the first level and an additional large-area busbar section which forms an opposing surface can be provided in the second level, wherein the large-area busbar section need not be connected to any of the three potentials and covers the busbar sections of the first level. This feature employs a busbar section which is not connected to any specific potential and which is included in the respective commutation path. The commutation process hereby also takes place by forming eddy currents in the busbar section which forms the opposing surface and is preferably at ground potential. The respective sections are sized so that the live busbar sections completely overlap with the opposite additional busbar section. Alternatively, the additional busbar section can be connected to one of the three potentials.

According to another aspect of the invention, the invention also relates to a circuit arrangement comprising a matrix converter and at least three capacitor elements, which are connected to one another via a low-inductance busbar system of the type described above.

The matrix converter can also be designed to include a plurality of separately configured and arranged output phase modules, which can be connected to the capacitor elements via the busbar system. Thus, the matrix converter is not a central component, but rather includes separate phase modules, for example three phase modules, each of which carries a separate output phase. The busbar system can then be designed so that the capacitor elements make contact with the appropriate phase modules. The phase modules can have a common associated capacitor block, which includes the various capacitor elements and makes contact with the individual modules via the busbar system. Alternatively, each phase module can have its own capacitor block with a plurality of capacitor elements.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 shows schematically in cross-section an exemplary arrangement of busbar sections according to the present invention, FIG. 2 shows schematically a plan view of the busbar system of FIG. 1, FIG. 3 shows schematically in cross-section another exemplary arrangement of busbar sections according to the invention, FIG. 4 shows schematically a plan view of the busbar system of FIG. 3, FIG. 5 shows schematically in cross-section yet another exemplary arrangement of busbar sections according to the invention, FIG. 6 shows schematically a plan view of the busbar system of FIG. 5, FIG. 7 shows schematically in cross-section another exemplary arrangement of busbar sections according to the invention, FIG. 8 shows schematically a plan view of the busbar system of FIG. 7.

DETAILED DESCRIPTION OF PREFERRED EMBODIMENTS

Figure 9:
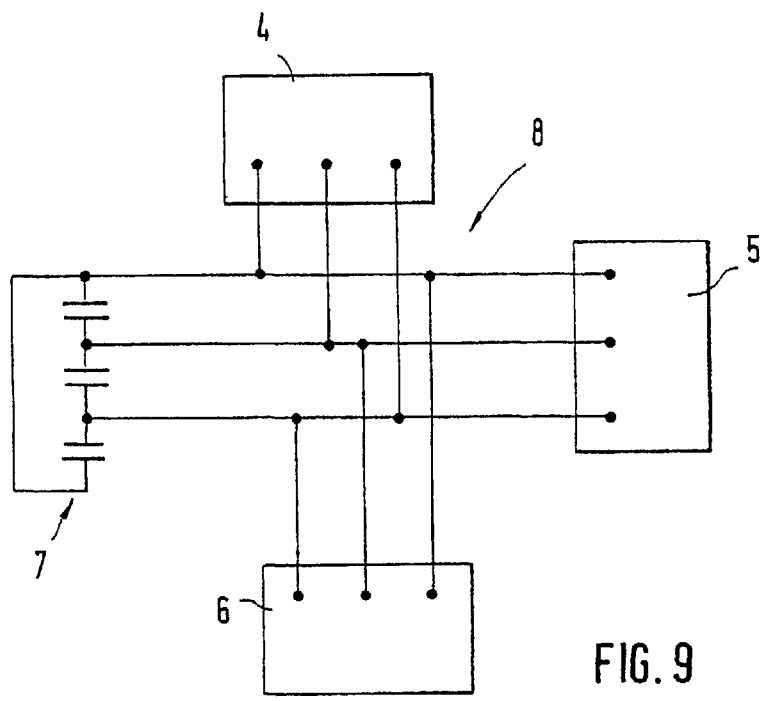
FIG. 9 shows an exemplary embodiment of a circuit arrangement according to the present invention.

Throughout all the Figures, same or corresponding elements are generally indicated by same reference numerals. These depicted embodiments are to be understood as illustrative of the invention and not as limiting in any way.

Turning now to the drawing, and in particular to FIG. 1, there is shown a schematic cross-section of a first exemplary embodiment of a busbar system according to the present invention. The illustration shows an insulating layer 1, in the illustrated example a board, such as a PCB, with busbar sections $V_1$, $V_2$, $V_3$ applied, for example coated, as large-area metallic conductor surfaces (for example made of aluminum) to the top face and the bottom face of the insulating layer 1. Each of the busbar sections in this exemplary embodiment is associated with a specific input voltage potential $P_1$, $P_2$ and $P_3$, which is supplied via capacitor elements which will be described in more detail with reference to FIG. 2. In the illustrated example, the upper busbar section $V_1$ is associated with the potential $P_1$, and the two lower busbar sections $V_2$ and $V_3$ are associated with the potentials $P_2$ and $P_3$. There is no specific required association between the input potentials and the respective busbar sections, so that the potentials may also be interchanged in any desired manner. This applies to all the exemplary embodiments which are described in the following text.

As can be seen, the exemplary upper busbar section $V_1$ is designed to be considerably broader than the lower busbar sections $V_2$, $V_3$. These are of such sizes and are positioned in such a way that a substantial area is covered by the upper busbar section $V_1$. They should be covered to as great an extent as possible, with an area coverage of, for example, at least 75%. This can also be seen in the form of a plan view in the layout illustration shown in FIG. 2.

The areas shown by dashed lines, which each represent busbar sections, are arranged in the upper level, while the surfaces shown by solid lines, which likewise represent busbar sections, are arranged in the lower level. As can be seen, the busbar section $V_1$ covers a large area of the two busbar sections $V_2$, $V_3$.

Overall, three commutation voltage pairs, or busbar section pairs, are formed between which the current and voltage are commutated. The first commutation voltage pair includes the busbar sections $V_1$ and $V_2$, and the second pair includes the sections $V_1$ and $V_3$. As can be seen, these commutation voltage pairs are arranged alongside one another, with the respective sections which participate in the commutation process being located opposite one another, and being isolated via the insulation layer. The third commutation voltage pairs $V_2$ and $V_3$ are located alongside one another. The commutation in this voltage pair is achieved by eddy currents, which are produced in the busbar section $V_1$.

FIG. 2 furthermore shows the busbar system of the capacitor elements and of the respective connections to the matrix converter. Overall, three capacitor elements $K_1$, $K_2$ and $K_3$ are provided. In the illustrated exemplary embodiment, the capacitor elements are placed from above onto the configuration shown in FIG. 2. The capacitor element $K_1$ is connected to the busbar section $V_1$ and to the busbar section $V_2$, with a suitable aperture 2 being provided in the busbar section $V_1$ for contacting the busbar section $V_2$. Likewise, the capacitor element $K_2$ makes contact with the busbar section $V_1$ and with the busbar section $V_3$. Both capacitor elements $K_1$ and $K_2$ are connected by the second contact to a common contact point on the busbar section $V_1$. Finally, the capacitor element $K_3$ is connected to the two busbar sections $V_2$, $V_3$, with the contact-forming connections in this case being passed through corresponding apertures 2 in the busbar section $V_1$.

Furthermore, each busbar section $V_1$, $V_2$, $V_3$ is connected to a corresponding one of connections $L_1$, $L_2$, $L_3$. The connections $L_1$, $L_2$, $L_3$ are part of the matrix converter 3, which is illustrated here only in the form of an example.

FIG. 3 shows another exemplary embodiment. The busbar sections are here also in the form of large-area metallic conductor surface coatings in two levels on the insulation layer 1. Overall, six busbar sections are used, with a respective one of the busbar sections $V_1$, $V_2$ and $V_3$ being provided in each level. A specific input potential $P_1$, $P_2$, $P_3$ is associated with each of the busbar sections $V_1$, $V_2$, $V_3$. The sectional view in FIG. 3 shows that, in this embodiment, three commutation voltage pairs located alongside one another are formed, namely the pair $V_1$–$V_2$, the pair $V_2$–$V_3$ and the pair $V_3$–$V_1$, each isolated via the insulation layer 1. The respective busbar sections which are located in one level are slightly spaced apart from one another for isolation purposes, with the exemplary isolation in the horizontal plane being provided via the air gap.

FIG. 4 shows a plan view of the busbar system of FIG. 3. The busbar sections which are located in the upper layer are shown by dashed lines, and the busbar sections which are located in the lower level are shown by solid lines. As in the previous embodiment, the respective capacitor elements $K_1$, $K_2$, $K_3$ make contact with the respective busbar sections, with appropriate apertures being provided in the respective connecting section, in order to make a through-contact. Since a respective busbar section which is associated with a specific potential $P_1$, $P_2$, $P_3$ is routed in each level, both busbar sections are connected to a common connection $L_1$, $L_2$, $L_3$, which an appropriate configuration of the busbar sections. The busbar sections $V_1$, $V_2$, $V_3$ which run in the lower level are in each case routed in straight lines to the respective conductor connection $L_1$, $L_2$ or $L_3$, the ends of the upper busbar sections $V_1$, $V_2$ and $V_3$ are designed to be appropriately angled, and are routed to the respective conductor connection $L_1$, $L_2$ and $L_3$. In the illustrated example, the two busbar sections $V_1$ make contact with the conductor connector $L_1$, the busbar sections $V_2$ make contact with the conductor section $L_2$, and the busbar sections $V_3$ make contact with the conductor connection $L_3$.

The modification illustrated in FIG. 3 shows a total of seven isolation points, namely the isolation between the upper and lower busbar sections (three isolation points) as well as the respective isolation gaps between the busbar sections located in one level (a total of four isolation points).

FIG. 5 shows a busbar system with a less complex isolation. Two busbar sections are provided in each level, the busbar sections $V_1$ and $V_2$ in the upper level, and the busbar sections $V_2$ and $V_3$ in the lower level. The busbar section $V_1$ in the upper level and the busbar section $V_3$ in the lower level are each designed to be very broad, thus ensuring that their central sections overlap. In this embodiment as well, a total of three commutation voltage pairs are formed, arranged alongside one another. The number of isolation points can in this case be reduced to a total of five, since only two busbar sections are provided in each level.

The corresponding layout of this busbar system is shown in FIG. 6. The one busbar section $V_1$ and the one busbar section $V_3$ are respectively connected to the line connection $L_1$ and $L_3$, and the two busbar sections $V_1$ are connected on the top face and bottom face to the common line connection $L_2$. The capacitor elements $K_1$, $K_2$, $K_3$ are in this case also connected correspondingly, in a known manner.

FIG. 7 shows yet another exemplary embodiment. Three busbar sections $V_1$, $V_2$, $V_3$ are arranged in the lower level, and a single very large-area busbar section $V_4$ is provided in the upper level. While the busbar sections $V_1$, $V_2$, $V_3$ are connected to a respectively associated potential $P_1$, $P_2$ and $P_3$, the busbar section $P_4$ is not connected to any specific potential, but is preferably connected to ground. The respective commutation voltage pairs in this embodiment are formed with the enclosure of the upper busbar section $V_4$, which forms a metallic opposing surface and substantially covers the busbar sections located underneath. Eddy currents are produced in the busbar section $V_4$ during commutation, thus making the commutation process possible. Although the busbar section $V_4$ need not be connected to a specific potential, they can advantageously be connected to ground to provide suppression at the same time.

The corresponding layout is shown in FIG. 8. As can be seen, each busbar section $V_1$, $V_2$, $V_3$ is connected to a respective line connection $L_1$, $L_2$ and $L_3$, and the busbar sections are interconnected to the corresponding capacitors $K_1$, $K_2$, $K_3$. The capacitor elements are all fitted to the modification from above, for which reason a correspondingly large number of apertures 2 are provided in the busbar section $V_4$ in order to make through-contact.

Overall, all the modifications allow a busbar system construction in two levels, thereby obviating the disadvantages of a three-layer structure. Furthermore, this two-layer configuration makes it possible to produce the busbar system in a highly cost-effective manner by coating the busbar sections onto a board.

FIG. 9 shows schematically an exemplary circuit arrangement according to the invention with separately provided output phases of the matrix converter. The illustrations show three phase modules 4, 5, 6, each of which with a specific associated phase. The phase modules 4, 5, 6 have a common capacitor block 7 with three individual capacitor elements, with the capacitor elements being connected via the illustrated busbar system 8 to the corresponding phase modules 4, 5, 6 which together form the matrix converter.

Figure 10:
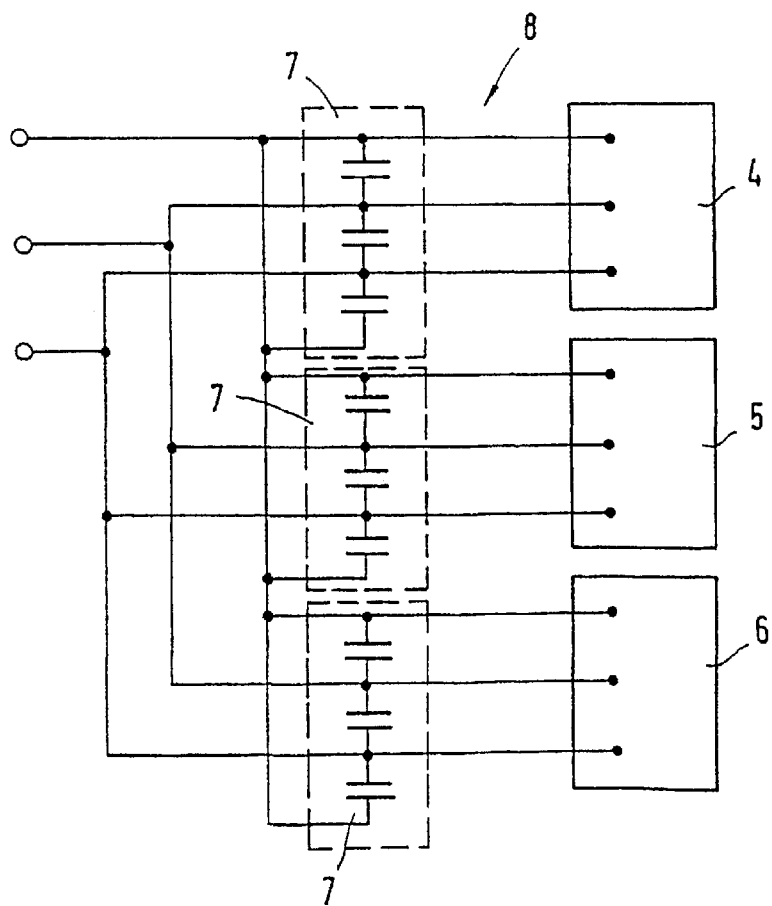
FIG. 10 shows another exemplary embodiment of a circuit arrangement according to the present invention.

FIG. 10 shows an alternative exemplary embodiment of a circuit arrangement with separate phase modules. In this case as well, three separate phase modules 4, 5, 6 again each have an associated capacitor block 7 with a number of capacitor elements. Like in the embodiment shown in FIG. 9, the individual capacitor elements are connected in a low-inductance manner via the illustrated busbar system.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. In a matrix converter including a plurality of switching elements arranged in a 3×3 matrix, and a plurality of capacitor elements connected on a network side of the matrix converter and supplying corresponding three input voltage potentials to the matrix converter, a low-inductance busbar system comprises a plurality of busbar sections which are isolated from one another and arranged in first and second levels.

2. The busbar system of claim 1, wherein there is associated at least one of the busbar sections with each of the input voltage potentials.

3. The busbar system of claim 1, wherein a first large-area busbar section is associated with a first one of the input voltage potentials in the first level, and second and third busbar sections are associated with a second input voltage potential and a third input voltage potential in the second level, wherein the second and third busbar sections at least partially overlap the first busbar section.

4. The busbar system of claim 3, wherein the first busbar section overlaps at least 75% of an area of the second and third busbar sections.

5. The busbar system of claim 1, wherein there is provided a corresponding one of the busbar sections for each of the input voltage potentials in each of the first and second levels.

6. The busbar system of claim 5, wherein the plurality of busbar sections are so disposed in the first and second levels that confronting busbar sections in the first and second levels define a commutation voltage pair.

7. The busbar system of claim 1, wherein a busbar section associated with a first input voltage potential and a busbar section associated with a second input voltage potential are provided in the first level, and a busbar section associated with the second voltage input potential and a busbar section associated with a third voltage input potential are provided in the second level, with the busbar sections arranged in such a way that confronting busbar sections define a commutation voltage pair and at least partially overlap one another.

8. The busbar system of claim 7, wherein overlapping areas of the confronting busbar are substantially of same size.

9. The busbar system of claim 1, wherein a first number of the busbar sections and the input voltage potentials are disposed in the first level in one-to-one correspondence, and one busbar section has a large-area and is provided in the second level for providing a counter surface, with the large-area busbar section overlapping the busbar sections in the first level.

10. The busbar system of claim 9, wherein the large-area busbar section is not connected to any of the three input voltage potentials.

11. The busbar system of claim 9, wherein the large-area busbar section is connected to one of the three input voltage potentials.

12. The busbar system of claim 9, wherein the large-area busbar section is connected to ground.

13. The busbar system of claim 1, wherein the plurality of busbar sections are in the form of flat metallic conductor layers disposed on an insulating layer.

14. The busbar system of claim 1, wherein the insulating layer is formed as a board and the metallic conductor layers are coated on the board.

15. The busbar system of claim 1, wherein the switching elements are semiconductor switches.

16. A circuit arrangement comprising a matrix converter including a plurality of switching elements arranged in a 3×3 matrix, at least three capacitor elements connected on a network side of the matrix converter and supplying corresponding input voltage potentials to the matrix converter; and a low-inductance busbar system including a plurality of busbar sections which are isolated from one another and arranged in two levels for connecting the capacitor elements to one another.

17. The circuit arrangement of claim 16, wherein the matrix converter includes a plurality of phase modules which are connected to the capacitor elements via the busbar sections.

18. The circuit arrangement of claim 17, and further comprising a capacitor block which commonly houses the capacitor elements and is connected to the plurality of the phase modules.

19. The circuit arrangement of claim 18, and further comprising a plurality of capacitor blocks, wherein each of the capacitor blocks includes a plurality of said capacitor elements wherein the capacitor elements are arranged in a plurality of capacitor blocks, wherein the capacitor blocks and the phase modules are placed into one-to-one correspondence.

* * * * *